United States Patent [19]

Adams

[11] 3,861,228
[45] Jan. 21, 1975

[54] TORQUE CONTROLLING SHEAVE
[76] Inventor: Hugh L. Adams, Box 13, Bassett, Ark.
[22] Filed: July 24, 1972
[21] Appl. No.: 274,491

[52] U.S. Cl. .................. 74/230.17 M, 74/230.17 A
[51] Int. Cl. .......................................... F16h 55/52
[58] Field of Search .............. 74/230.17 M, 230.7 C

[56] References Cited
UNITED STATES PATENTS

| | | | |
|---|---|---|---|
| 2,382,935 | 8/1945 | Armitage | 74/230.17 A |
| 2,678,566 | 5/1954 | Oehrli | 74/230.7 M |
| 2,711,103 | 6/1955 | Miner | 74/230.17 M |

FOREIGN PATENTS OR APPLICATIONS

| | | | |
|---|---|---|---|
| 943,708 | 10/1961 | Great Britain | 74/230.17 M |
| 921,462 | 5/1947 | France | 74/230.17 C |
| 1,124,210 | 10/1956 | France | 74/230.17 M |
| 30,003 | 12/1912 | Great Britain | 74/230.17 M |

Primary Examiner—Charles J. Myhre
Assistant Examiner—R. H. Lazarus
Attorney, Agent, or Firm—Ralph W. Launius

[57] ABSTRACT

The present application is directed to a sheave having a pair of discs adapted to accommodate a belt between them for driving same, and for driving any shaft to which the sheave is attached. The pair of discs is movable, either bringing the discs closer together or farther apart; means are provided to so move the discs in response to changes in torque exerted upon the said shaft, such movement being done automatically and in proportion to the torque exerted, within the operating limits of the sheave. Additionally, means are provided to transmit torque from the discs in a resilient manner.

11 Claims, 4 Drawing Figures

TORQUE CONTROLLING SHEAVE

This invention relates to improvements in sheaves; more particularly, the invention relates to improvements in transmitting torque therethrough. Still more particularly, the invention relates to such sheaves which change their pitch variably, especially those which change pitch automatically in response to changes in tension or torque. More generally, the invention relates to improvements in transmitting constant horsepower from a constant speed driving source to a varying speed driven power consumer.

Sheaves generally transmit constant horsepower from a constant speed driving source. This property is a disadvantage in applications where a constant horsepower output is not desired, as, for example, in driving propelling members on machines in tandem operation where tension in propelled material must be controlled to prevent accumulation of material if the tension is too little or breakage if the tension is too great.

Variable pitch sheaves have been developed to aid in the control of tension in propelled material, and some such sheaves change pitch automatically in response to tension or torque. Such Sheaves do not change pitch in proportion to the torque however.

Variable output sheaves have been developed which are more complex and bulky than need be and which do not operate as smoothly as they might.

Variable output sheaves have also been developed but the output torque thereof is not adjustable.

Variable output sheaves have further been developed which transmit the working torque through a spring and which are provided with cam slots and rollers, but the transmission of torque has not been as efficient as might be the case.

Sheaves have been also developed which adjust output torque automatically but they have made no provision for preventing the accumulation of foreign matter interfering with the proper working of the sheaves.

It is therefore an object of the present invention to provide a variable output sheave which is simpler and less bulky than prior ones, and which also operates smoother in addition.

Another object of this invention is to provide a sheave which will transit constant horsepower from a constant speed driving source to a varying speed driven power consumer.

Still another object is to provide a variable output sheave wherein the output torque is adjustable.

Yet another object is to provide a variable output sheave wherein the transmission of torque therethrough is more efficient than was previously the case.

A further object is to provide a sheave which adjusts output torque automatically and which provides for preventing the accumulation of foreign matter which would interfere with proper working of the sheave.

Other objects and advantages of the present sheave will become apparent from a consideration of the detailed part of the specification following, taken in conjunction with the appended drawing in which like numerals represent like parts throughout the several views, and in which.

Figure 1:
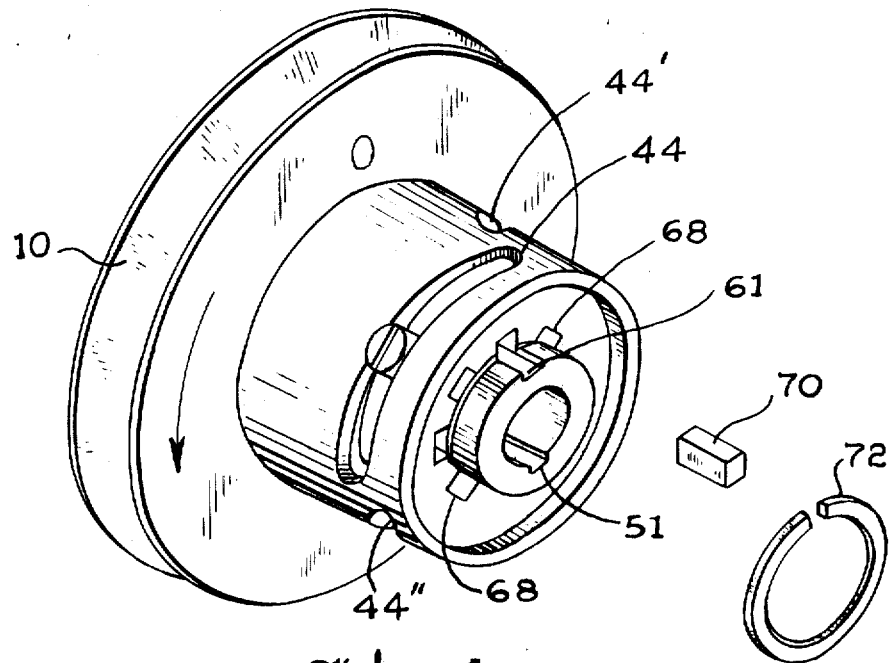
FIG. 1 is a perspective view, partly exploded, of the present sheave.
Figure 2:
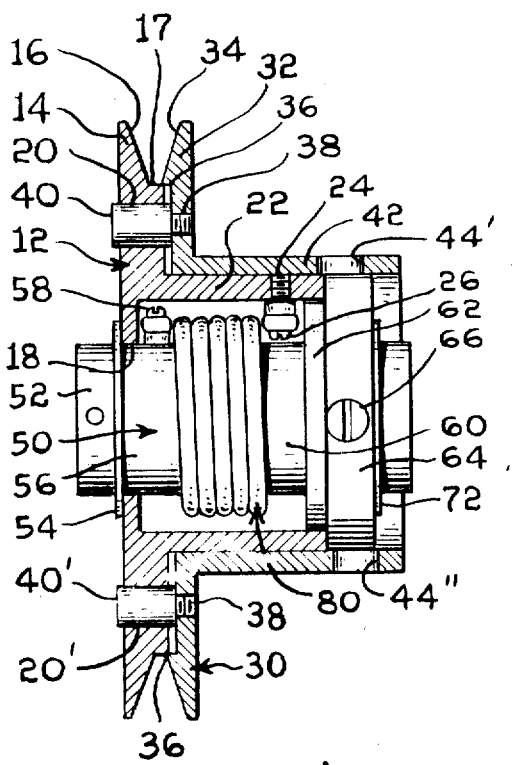
FIG. 2 is a side elevational view, cut away and partly in section.
Figure 3:
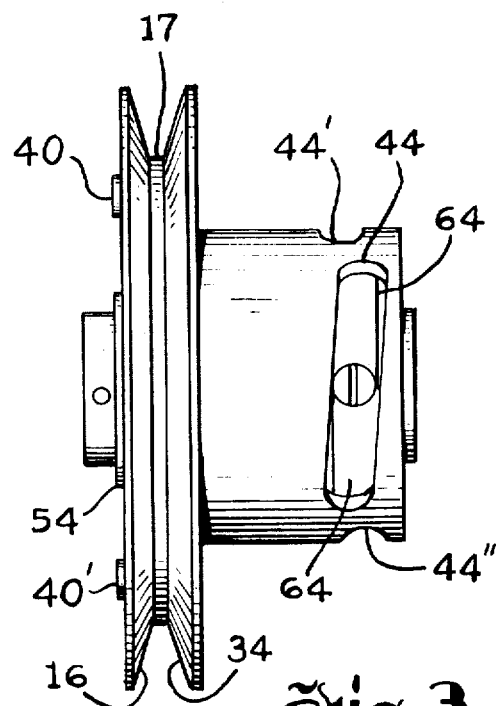
FIG. 3 is a side elevational view, without any sectioning.

The sheave of the present invention is generally designated 10 and comprises generally a pair of discs which are axially moveable with respect to each other, but preferably a stationary disc 12; a moveable disc 30, the latter being axially but not rotationally moveable with respect to the former; and elongated hub member 50; and a torsion spring 80. The two discs are oppositely disposed and the inner faces thereof form an inverted V-shape in cross-section for the accommodation of a V-belt. Each of the two discs has numerous component parts.

Hub member 50 is adapted to transmit torque received from the two discs by virtue of having torsion spring 80 coiled, but not necessarily gripping, the intermediate portion 56 thereof and by virtue of the two detent screws, 26 and 58.

Collectively these numbered parts may be taken as a transmission means. Hub member 50 is further adapted to be attached to a shaft to be driven by the sheave, which may be considered as an attaching means.

Cam roller collar 64, journal 62 and cam rollers 66, 66' and 66" form a part of hub member 50 and taken in conjunction with generally helical transverse slots 44, 44' and 44" and spring 80 form the resilient means to introduce resiliency into the transmission and also the means for varying the pitch of the sheave automatically in response to torque and in proportion to the torque. The means for so varying the operating torque is adjustable by means of keyways 61 and 68 taken in conjunction with key 70, and may be called adjusting means; the means for so varying the operating torque is also adjustable by means of cam roller retaining screws 67, 67' and 67" positioned in a series of tapped apertures 69 and used in conjunction with an index mark.

Turning now to FIGS. 1–4, the sheave generally designated 10 has a first or stationary disc generally designated 12. Disc 12 has an annular shoulder 13 preferably and a flange member 14 which member has a frustroconical surface 16. Disc 12 further has a generally centrally disposed aperture 18 and a pair of apertures 20 and 20' which are disposed on opposite sides of aperture 18. Disc 12 has in addition an elongated annular first hub member 22 which member has tapped aperture 24 in the wall thereof in which is positioned torque spring anchoring screw 26.

A floating or moveable disc generally designated 30 forms a part of sheave 10 and is generally disposed opposite to disc 12 so as to nearly mate. Disc 30 has an annular flange member 32 which member has frustroconical surface 34, which surface forms an inverted annular V in conjunction with surface 16 on disc 12, with annular surface 17 of disc 12 forming a flat annular top for the inverted V. Member 32 further has an annular surface 36 which surface mates with surface 17 when the two discs are close enough together. Flange member 32 has in addition a pair of apertures 38 and 38' which are in alignment with apertures 20 and 20' respectively and are tapped for the positioning of means 40 and 40' which protrude through apertures 20 and 20' respectively, securing the discs 12 and 30 from rotational movement. Disc 30 still further has an elongated second hub member 42 which is sleeved over first hub member 22 of disc 12, preferably with annular bearing 43 between the two hub members. Hub member 42 has generally helical transverse slots 44, 44' and 44" in the wall thereof, positioned generally at the end opposite to the end having the flange.

A third elongated hub member generally designated 50 has an internal keyway 51 for attachment to a shaft, and has a forward portion 52 positioned in aperture 18 of disc 12 with retaining ring 54 securing it therein; preferably annular bearing 19 which is preferably L-shaped, is positioned between member 50 and aperture 18 of disc 12. Hub member 50 further has an intermediate portion 56 which portion has a tapped aperture in which torque spring anchoring screw 58 is positioned. Hub member 50 has still further a rearward portion 60 having an external keyway 61, an annular cam roller collar journal 62 and an annular cam roller collar 64, the journal and the collar fitting within and generally mating with the inner surfaces of the first and second hub members respectively. Preferably annular bearing 63 which is preferably L-shaped, is positioned between member 62 and the inner surfaces of the first and second hub members.

Cam roller collar 64 has outwardly projecting cam rollers 66, 66' and 66", the latter two not visible, which project through the generally helical slots 44, 44' and 44" respectively of the second hub member. The cam rollers are attached to cam roller screws which are positioned in tapped apertures in collar 64. Cam roller collar 64 further has a multiplicity of internal longitudinal keyways 68 which in conjunction with keyways 61 and key 70 permit the operating torque to be adjusted; retaining ring 72 secures key 70 in the keyways. In another embodiment, cam roller collar 64 is provided with a series or multiplicity of tapped apertures 69 and an index mark which in conjunction with cam roller retaining screws 67, 67' and 67" permit the operating torque to be adjusted.

A torsion spring generally designated 80 is coiled about but not gripping the intermediate portion of hub member 50 and in conjunction with screws 26 and 58, forms a transmission means for transmitting torque from the disc 12 and 30 to hub member 50. This transmission, in conjunction with the aforementioned resilient means make up the resilient transmission means.

OPERATION

Figure 4:
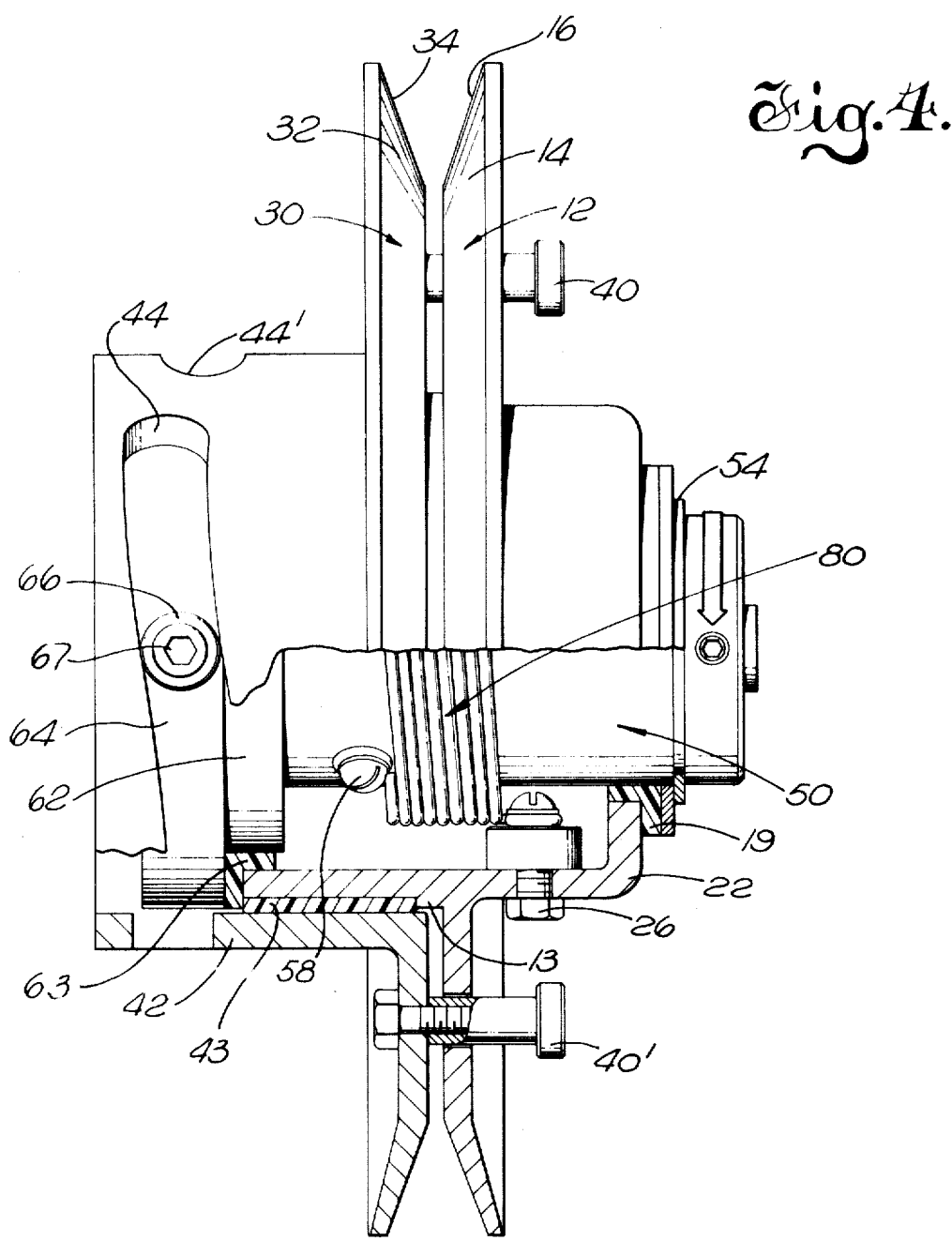
FIG. 4 is a side elevational view, cut away and partly in section, of another embodiment of the present sheave.

The desired operating torque is adjusted by preloading the torsion spring 80 and aligning keyway 61 and a selected one of keyways 68, inserting key 70 therein and securing same with retaining ring 72; alternatively such torque may be adjusted by preloading spring 80 and aligning a set of three of the tapped apertures 69 with helical slots 44, 44' and 44", and then engaging the tapped apertures with cam roller retaining screws 67, 67' and 67" having cam rollers 66, 66' and 66" respectively attached. The desired operating torque is adjusted when cam rollers 66, 66' and 66" are in the center portion of helical slots 44, 44' and 44". Then hub member 50 is attached to a keyed shaft, the key of the shaft entering internal keyway 51. Then a powered V-belt is positioned between surfaces 16 and 34, which belt will drive the sheave in the direction of the curved arrow as shown in FIG. 1, and the straight arrow as shown in FIG. 4.

When driven by the belt, the two discs 12 and 30, along with the elongated screw 26 turns therewith. As it turns, screw 26 transmits torque through the torsion spring 80, a coil spring, to screw 58 which is attached to hub 50. Screw 58, being attached to hub member 50, casues hub member 50 to rotate in the same direction.

If due to variables the torque on the driven shaft, changes the additional torque, causes cam roller 64 and cam roller 66, 66' and 66" to rotate relative to helical slots 44, 44' and 44".

The cam rollers cam against the sides of the helical slots 44, 44' and 44" respectively in proportion to the torque exerted on the cam rollers causing disc 30 to move towards disc 12 against the urging of spring 80. This movement of the disc 30 results in a larger pitch diameter of the belt path, which results in a reduction in speed of the driven shaft. As soon as the torque is removed, the disc 30 returns to its original position because of the spring.

If due to variables in torque on the driven shaft, the torque is decreased, disc 30 will move away from disc 12, at the urging of spring 80 resulting in a reduced pitch diameter of the belt path and hence an increase in the speed of the driven shaft. Additional torque will cause disc 30 to return to its original position.

With the present sheave, the rotating speed of a shaft to which attached is a function of the output torque of the sheave, within the operating limits of the sheave. If not within the operating limits of the sheave, then torque is still transmitted but the transmission is no longer resilient.

Bearings 19, 43 and 63 are preferably provided for better operation of the sheave.

By positioning the torsion spring through which torque is transmitted inside the first two hub members and around third hub member 50, a much more streamlined, smoother operating and simpler structure results than was previously the case; also more mass is concentrated near the center of gravity of the sheave for smoother more efficient operation.

The output torque of the sheave is adjustable by means of keyways 68 and 61 in conjunction with key 70 which lock the prestressed torsion spring in a preselected degree of stress at the outset; the number of keyways 68 is a matter of choice. The output torque of the sheave is also adjustable by means of cam roller retaining screws 67, 67' and 67" in conjunction with tapped apertures 69 which lock the prestressed torsion spring in a preselected degree of stress at the outset; the number of tapped apertures is a matter of choice.

It is preferred to have at least as many cam rollers cooperating with helical slots as will define a plane which is perpendicular to the axis of hub member 50, as well as the first and second hub members. In this manner, more efficient transmission results without any significant tendency to bind the mechanism because of asymmetric thrust. Thus at least three cam rollers and helical slots are preferred.

The present variable pitch sleeve has an annular shoulder 13 of such length on disc 12 and also cam slots of sufficient helical lead as to cause a cleaning action on the internal surface of hub member 42 each time the sheave stops rotating. This prevents an accumulation of foreign matter between discs 12 and 30 and insures free axial relative movement thereof.

The torsion spring through which torque is transmitted is enclosed preferably, not only to streamline the design of the sheave, but to keep the spring from catching on nearby objects and also to keep it free from foreign matter.

From the foregoing, it will be apparent that applicant has provided a sheave having a resilient transmission which is suitable for the transmission of the total working torque of the sheave. Within the operating limits of the sheave, changes in torque applied to a shaft driven by the sheave will cause the cam roller collar to rotate and hence the two discs 12 and 30 to come closer together or move further apart, and such movement will be in proportion to the change in torque. Thus with proper spring adjustment, constant horsepower may be transmitted by the present sheave from a constant speed driving source, though the power consumer is driven at varying speeds, as, for example, in connecting two or more power supplies to a common consumer. It will be further apparent that the present sheave is simpler, smoother operating and less bulky than prior sheaves and that the output torque of the presnet sheave is adjustable as compared to prior sheaves. It will also be realized that the present sheave transmits torque more efficiently than previous ones of its kind and that the present sheave excludes foreign matter better than previous ones, thus assuring better operation of the present sheave.

It is to be understood that only the preferred embodiments have been described in the foregoing part of the specification and that the invention may be practiced otherwise than as specifically described. Thus the invention is not to be limited to the details disclosed herein, but is to be accorded the full scope of the following claims.

What is claimed is:

1. An improved variable pitch sheave having a torsion spring for transmitting torque, the sheave having a pair of discs which have generally opposing faces which are adapted in conjunction to receive a flexible member, the two discs being axially moveable with respect to each other and each disc having an elongated portion, one such elongated portion being an outer portion and the other being an inner portion, said outer portion being sleeved over said inner portion the sheave also having an elongated hub member positioned within the sleeved over portions and coaxial therewith, said hub adapted to receive the torsion spring thereabout and said torsion spring being fixed at one end to said hub member and at the other end to said inner portion further adapted to receive a shaft for driving.

2. An improved sheave according to claim 1 in which the spring is provided with means to adjust the degree of its stress, prior to operation of the sheave.

3. An improved sheave according to claim 2 in which the elongated hub member has at least three projections and the outer elongated portion has at least three helical slots through which the projections project and are cammed thereby.

4. An improved sheave according to claim 3 in which the helical slots have sufficient lead to provide good cleaning action when the sheave stops rotating.

5. An improved sheave according to claim 4 which has an annular shoulder upon one of said discs sufficient to prevent accumulation of foreign matter between the two discs.

6. An improved sheave according to claim 5 which has a bearing positioned between the two sleeved over portions, and in which the elongated hub member is mounted in bearings.

7. An improved sheave according to claim 6 in which one of the said pair of discs is fixed and the other axially moveable with respect thereto, the fixed disc having an annular shoulder sufficient to insure cleaning action upon the moveable disc each time the sheave stops rotating.

8. An improved sheave according to claim 2 in which the means to adjust the degree of compression of the spring is an external keyway in the elongated hub member and a multiplicity of internal longitudinal keyways in surrounding structure, the external keyway and a selected one of the internal keyways forming a slot in conjunction, and a key fitting in the slot.

9. A sheave comprising a pair of opposing discs, a first stationary disc and a second axially moveable disc, the discs being adapted in conjunction to receive a flexible belt, the first disc having a first elongated hub member and the second disc having a second elongated hub member generally sleeved over the first hub member; a third hub member positioned inside the first and second hub member; a coil spring positioned about the third hub member and between two detent members, one detent member on the third hub and the other on the first hub member; a cam roller collar on said third hub member, and having a journal and three projections thereon; three transverse helical slots in the second hub member and through which the said three projections project, one projection in each slot; a multiplicity of longitudinal keyways in the cam roller collar; an external keyway in the third hub member; a key for keying the external keyway and a selected one of the longitudinal keyways; and an internal keyway in the third hub member for attaching same to a shaft.

10. An improved sheave according to claim 2 in which the means to adjust the degree of stress of the spring is a plurality of detachable cam roller retaining screws and a multiplicity of tapped apertures in the cam roller collar and an index mark by means of which the positions of the apertures can be ascertained.

11. A sheave according to claim 9 which has a multiplicity of tapped apertures in the cam roller collar instead of a multiplicity of longitudinal keyways and the like; three cam roller retaining screws positioned in a selected set of three tapped apertures; and an indexing mark whereby the stress on the torsion spring may be adjusted.

* * * * *